(12) United States Patent
Nakano et al.

(10) Patent No.: US 8,011,834 B2
(45) Date of Patent: Sep. 6, 2011

(54) OPTICAL CONNECTOR PLUG

(75) Inventors: Toshiaki Nakano, Tokyo (JP); Tsuyoshi Yoshizaki, Tokyo (JP)

(73) Assignee: Honda Tsushin Kogyo Co., Ltd., Tokyo (JP)

(*) Notice: Subject to any disclaimer, the term of this patent is extended or adjusted under 35 U.S.C. 154(b) by 905 days.

(21) Appl. No.: 12/007,785

(22) Filed: Jan. 15, 2008

(65) Prior Publication Data
US 2010/0284655 A1   Nov. 11, 2010

(30) Foreign Application Priority Data
Jan. 17, 2007 (JP) .................. 2007-007849

(51) Int. Cl.
*G02B 6/36* (2006.01)
(52) U.S. Cl. ........................................................ 385/78
(58) Field of Classification Search ............... 385/78
See application file for complete search history.

(56) References Cited

FOREIGN PATENT DOCUMENTS
JP       2005221668    *  8/2005
JP       2005-308803      11/2005
* cited by examiner

*Primary Examiner* — Uyen Chau N Le
*Assistant Examiner* — Hoang Tran
(74) *Attorney, Agent, or Firm* — Wenderoth, Lind & Ponack, L.L.P.

(57) ABSTRACT

An optical connector plug includes an approximately square cylindrical rear cover of an insulating member fitted over an outer surface of a stop ring, and a cylindrical front cover which is urged frontward by an elastic member and is slidable back and forth at an outer surface of a plug frame. The front cover has a flexible plate-like shutter on an inner wall, which blocks the tip of a ferrule. The shutter has an upright curved portion formed by curving a tip side in an arc shape. When the front cover moves backward, the curved portion of the shutter is pressed against a tip of the plug frame to become flat and is pressed against the inner wall of the front cover to be retained in a plate form, thereby releasing a light-shielding state of the optical fiber.

5 Claims, 14 Drawing Sheets

OPTICAL CONNECTOR PLUG

BACKGROUND OF THE INVENTION

1. Field of the Invention

The present invention relates to an optical connector plug provided with a shutter to shield intense light from an optical fiber cable to avoid direct view of the light.

2. Prior Art

In recent optical communications, the power of a light source is increased with an increase in the amount of optical communications due to wavelength multiplexing or the like. This brings about a problem such that direct view of an optical signal during the process of connecting an optical connector may damage eyes. As the optical-communication based Internet or the like is introduced in offices and homes, chances for ordinary persons other than skilled experts to handle optical connector plugs increases. This makes it more likely that persons will directly view an optical signal. Further, the tip portion of an optical cable should be prevented from being contaminated with dust or the like. In view of the foregoing situation, a light-shading device (shutter) is provided at an optical connector plug as eye protecting means and dust protecting means.

An SC (Single Coupling) optical connector plug provided with such a shutter is disclosed in JP-A-2005-308803. The optical connector plug is configured in such a way that a part of a metal shutter is folded to provide a projection as a shutter open/close means. The projection is brought into direct contact with an opening of a counterpart adapter at the time of attaching the optical connector plug to the adapter, and is pressed into the opening against the urging force of an elastic member for the shutter to release the shutter, and when the optical connector plug is pulled out of the adapter, the shutter is returned to the original position by the repulsive force of the elastic member. An external housing to be fitted over the outer surface of a plug frame that supports a ferrule includes a hold portion and a slide sleeve portion. When the slide sleeve portion is pressed in against the urging force of the elastic member for the sleeve by the counterpart adapter and is pulled out of the adapter, the shutter is returned to the original position by the repulsive force of the elastic member for the sleeve.

SUMMARY OF THE INVENTION

With the above shutter structure, however, a part of the metal shutter protrudes from the body of the SC plug, so that a worker may be injured. Further, the projection interferes with the shape of the counterpart adapter and high-density implementation and thus disables the use of the optical connector plug. Furthermore, two springs are needed as the elastic member for the shutter and the elastic member for the sleeve in the external housing, resulting in an increased number of parts.

Accordingly, it is an object of the present invention to provide an SC type optical connector plug that overcomes the problem.

To overcome the problem and achieve the object, an optical connector plug of the present invention is comprised of a boot of a synthetic resin that encloses an optical fiber cable; a cylindrical stop ring having at a rear end a caulking ring for fixing the optical fiber cable; a ferrule that supports a tip portion of an optical fiber; a cylindrical plug frame of a synthetic resin in which the ferrule is to be inserted and over which the stop ring is to be fitted; an approximately square cylindrical rear cover (i.e., a hollow rear cover having a substantially rectangular cross section) of an insulating member fitted over an outer surface of the stop ring; and a cylindrical front cover slidable back and forth at an outer surface of the plug frame, wherein the front cover is urged frontward by an elastic member and has, on an inner wall, a plate-like shutter having flexibility, which blocks a tip of the ferrule, a tip side of the shutter being curved in an arc shape, forming an upright curved portion, so that the curved portion of the shutter is pressed against a tip of the plug frame to become flat and is pressed against the inner wall of the front cover to be retained in a plate form when the front cover moves backward, thereby releasing a light-shielding state of the optical fiber.

It is preferable that the shutter is made from a pair of pieces facing each other, of which engaged positions at rear end portions are shifted in a forward and backward direction in such a way that tip portions of the pieces overlap each other.

Further, it is preferable that the elastic member urging the front cover frontward is disposed in a clearance between the stop ring and the rear cover, and repulsive force of the elastic member is set smaller than an engagement resistance at a time of connection to a counter part of the optical connector plug.

The shutter may be a single piece whose curved portion at the tip side is long.

Furthermore, it is preferable that the front cover has a protrusion extending in an axial direction on a rear outer side, and the rear cover has a guide groove at a position corresponding to the protrusion, which receives the protrusion while guiding the protrusion.

Preferably, the rear cover has elastic engagement pieces at both side portions, which extend frontward and have engagement claws protruding inside, and the front cover has engagement portions to engage with the engagement claws formed at rear side walls to stop pull-out of the front cover.

According to the optical connector plug of the present invention, the shutter is retained inside the front cover and does not protrude outside, so that a worker is not injured, and the shutter moves together with the front cover, thus eliminating the need for a particular return spring for the shutter. This leads to a reduction in the number of components.

The engage positions of the rear end portions of the shutters are shifted in the forward and backward direction in such a way that the tip portions of the front portions of the shutters overlap each other to reliably shield light from the optical fiber in an unfitted state, thus ensuring a light-shielding action.

Further, the repulsive force of the elastic member which urges the front cover frontward to return the front cover to the original position is set smaller than an engagement resistance at a time of connection to a counter part of the optical connector plug, and therefore, the front cover automatically moves backward upon insertion into the counter part such as an adapter.

DETAILED DESCRIPTION OF THE PREFERRED EMBODIMENTS

Figure 1:
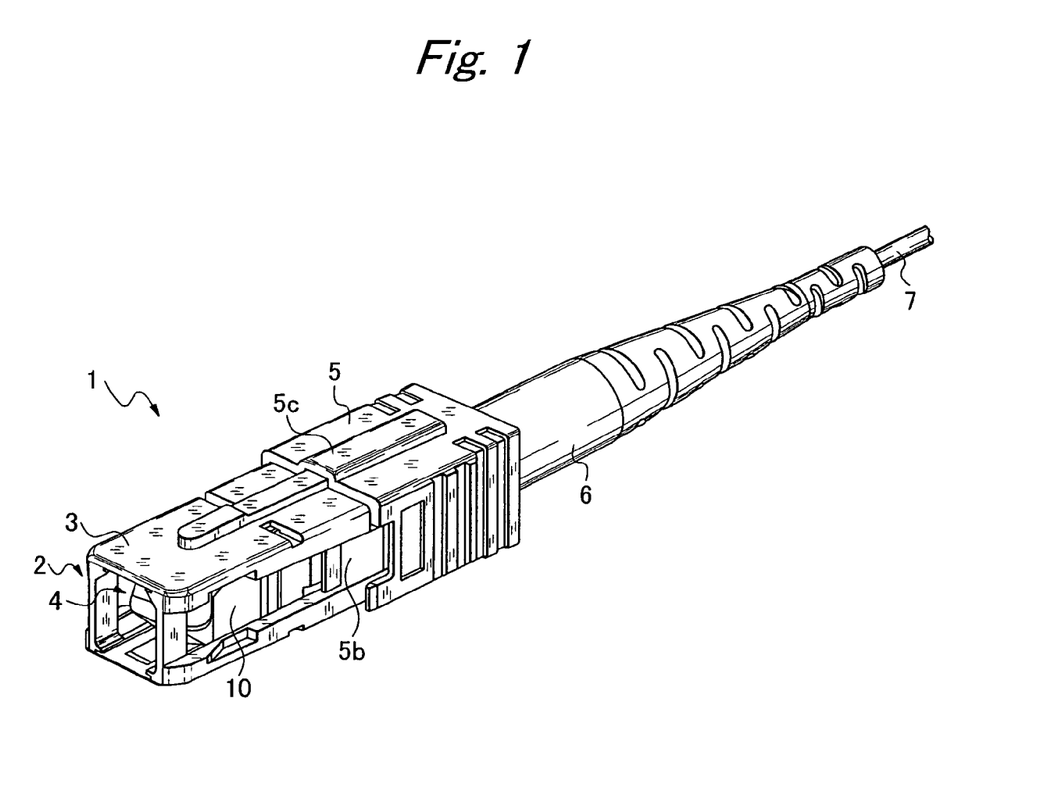
FIG. 1 is a general perspective view showing an optical connector plug according to a first embodiment of the present invention.

FIG. 1 shows an optical connector plug 1 according to a first embodiment of the present invention. The optical connector plug 1 has a light-shielding member 2, which is provided on an adapter fitting side and shields light from the end face of an optical fiber enclosed in a ferrule. That is, the optical connector plug 1 is comprised of a boot 6 of a synthetic resin enclosing an optical fiber cable 7, a cylindrical stop ring 9 of a metal or a synthetic resin having at a rear end a cylindrical caulking ring 8 surely fixing the optical fiber cable 7, a ferrule 11 supporting a tip portion of core 7a of the optical fiber cable 7, a square cylindrical plug frame (i.e., a hollow plug frame having a substantially rectangular cross section) 10 of a synthetic resin in which the ferrule 11 is to be inserted and over which the stop ring 9 is to be fitted, an approximately square cylindrical rear cover 5 of an insulating member fitted over an outer surface of the stop ring 9, a cylindrical front cover 3 slidable back and forth at an outer surface of the plug frame 10, and the light-shielding member 2 (see FIG. 2B).

Figure 3:
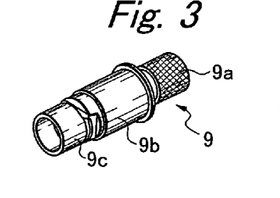
FIG. 3 is a perspective view showing a stop ring of the optical connector plug.
Figure 4A:
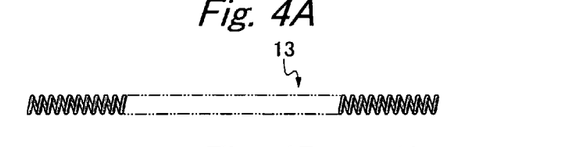
FIG. 4A is a plan view showing a spring of the optical connector plug.
Figure 4B:
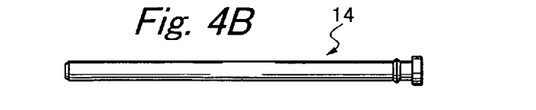
FIG. 4B is a plan view showing a pin which supports the spring.

As shown in FIG. 3, the stop ring 9 forms the base of the optical connector plug 1 formed in an approximately cylindrical form. The optical fiber cable 7 is connected to the stop ring 9 via the caulking ring 8. The rear cover 5 is fitted over the stop ring 9 from the rear and is fitted into the plug frame 10 to which the front ferrule 11 is fitted. The caulking ring 8 is fitted over a rear portion 9a of the stop ring 9. The rear cover 5 is fitted over the outer surface of a center portion 9b. Provided inside a front portion 9c is a spring 12 which has a rear end supported at a step surface formed deep inside the front portion 9c and urges the ferrule 11 frontward. A spring 13 which urges the front cover 3 frontward is provided in a space between the stop ring 9 and the rear cover 5, with a guide and seat bending prevention pin 14 inserted in the spring 13 (see FIGS. 4A and 4B).

Figures 5A, 5B, 5C, 5D, 5E, 5F, 5G:
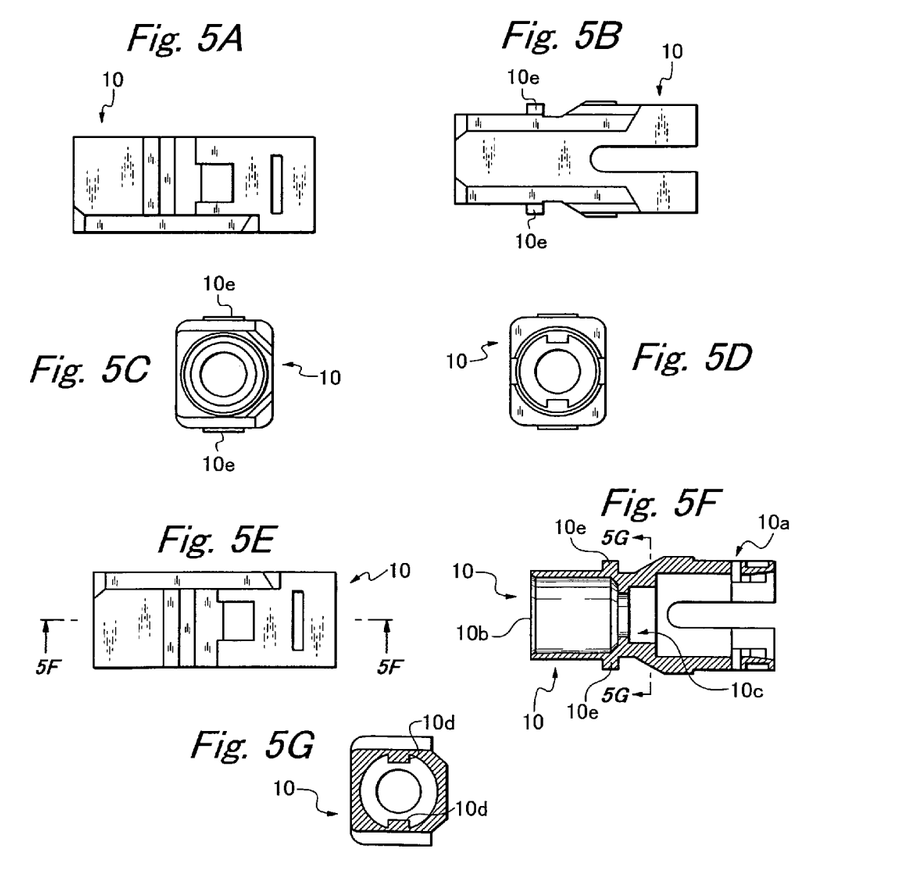
FIGS. 5A to 5E are a plan view, a front view, a left side view, a right side view, and a bottom view each showing a plug frame of the optical connector plug.
FIGS. 5F and 5G are a cross-sectional view as viewed from line 5F-5F in FIG. 5E, and a cross-sectional view as viewed from line 5G-5G in FIG. 5F.
Figure 6A:
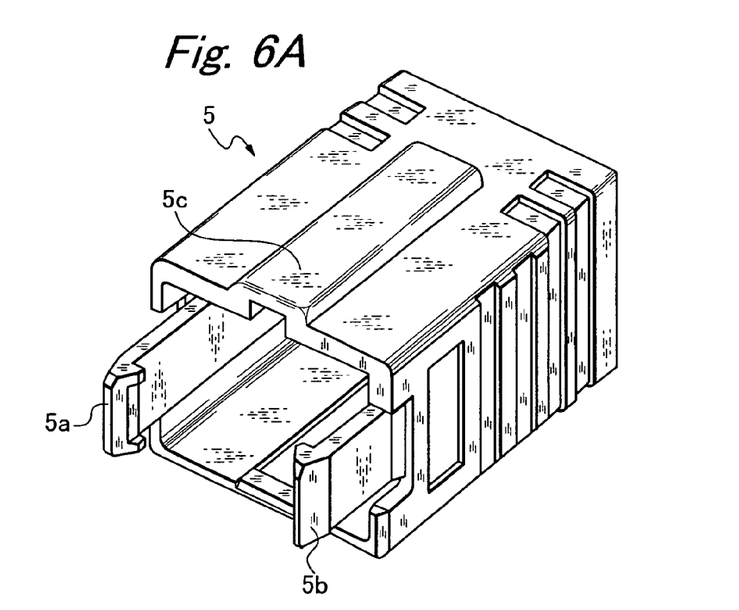
FIGS. 6A and 6B are perspective views showing a rear cover of the optical connector plug as viewed from a front side and as viewed from a rear side, respectively.
Figure 6B:
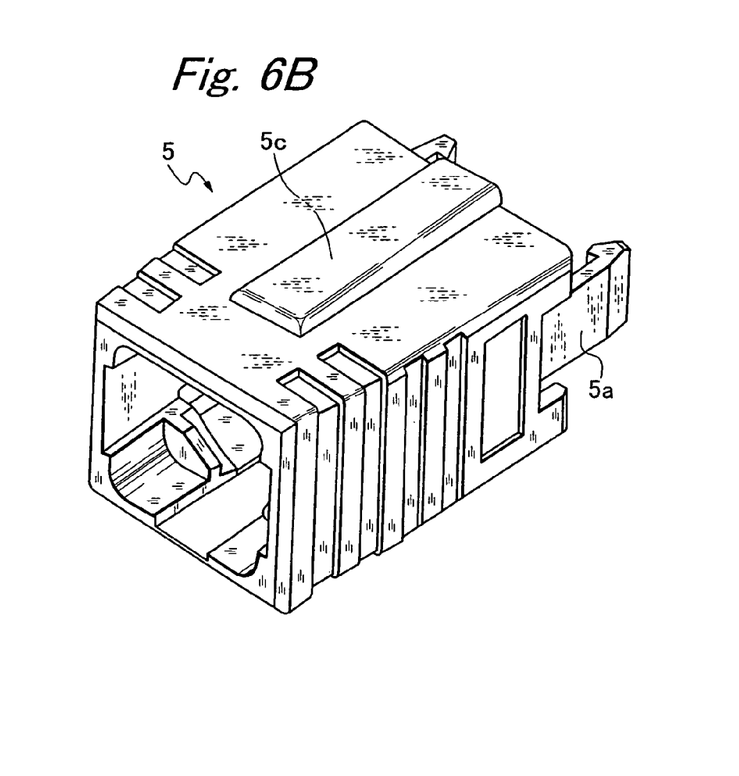

As shown in FIGS. 5A to 5G, the plug frame 10 is formed of a synthetic resin into an approximately square cylindrical shape, and the ferrule 11 attached to the core 7a of the optical fiber cable 7 is inserted into the plug frame 10 from the rear to a step portion 10c formed inside the plug frame 10. As shown in FIG. 5G, projections 10d, 10d formed at the step portion 10c are fitted in recess portions of the ferrule 11 to be a detent. Projections 10e, 10e formed at the outer surface portion are engaged with fitting locking elastic claws 15a, 15a when the optical connector plug 1 is fitted to an adapter 15 to be described later (see FIG. 13A).

Figure 7A:
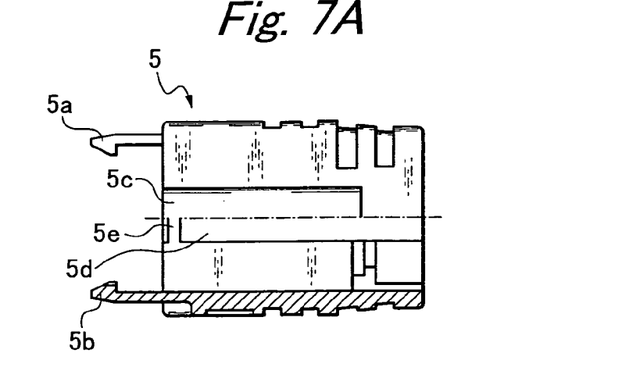
FIGS. 7A to 7E are a partly broken-away plan view, a side view, a rear view, a longitudinal side cross-sectional view and a front view each showing the rear cover.
Figure 7B:
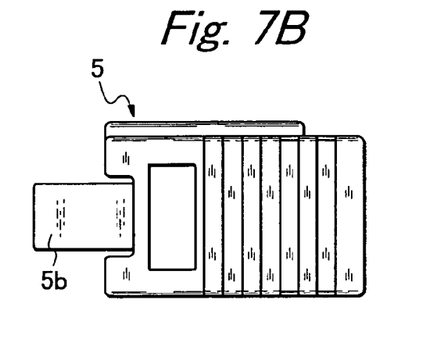
Figure 7C:
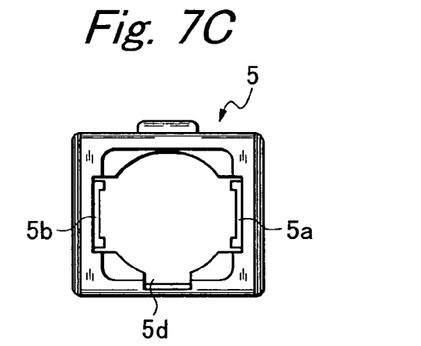
Figure 7D:
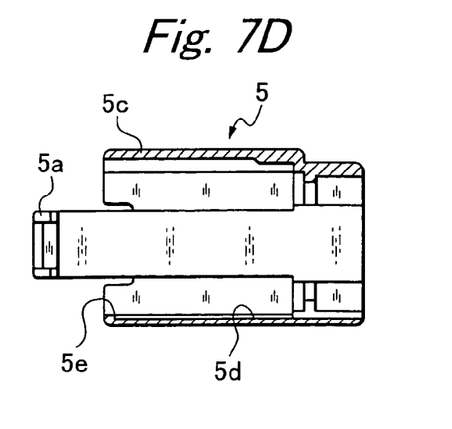
Figure 7E:
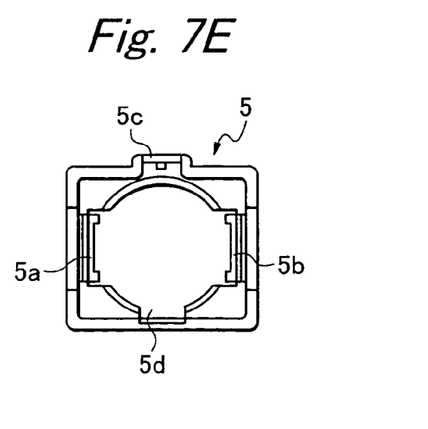
Figure 8A:
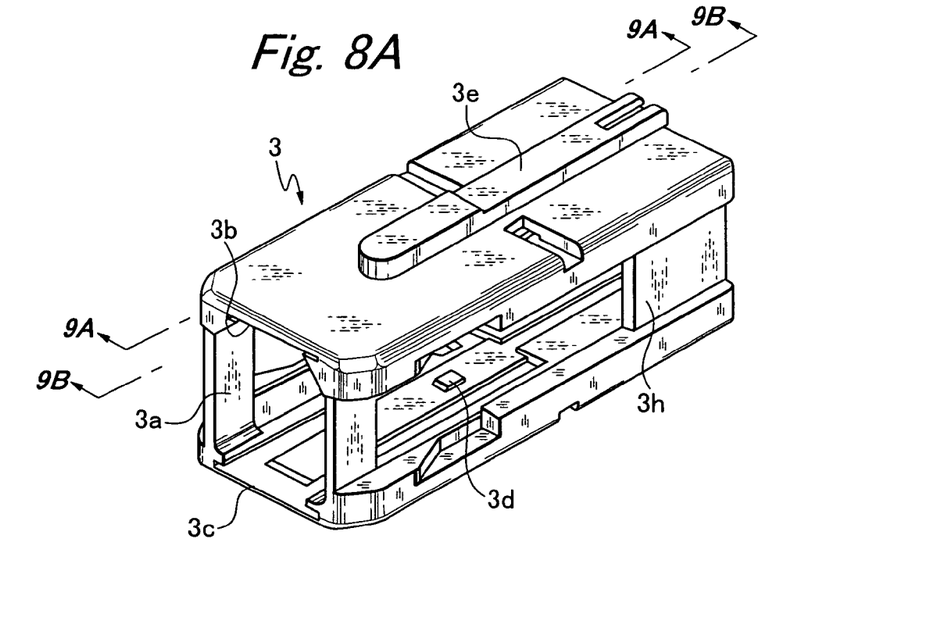
FIGS. 8A and 8B are perspective views showing a front cover of the optical connector plug as viewed from a front side and as viewed from a rear bottom side, respectively.
Figure 8B:
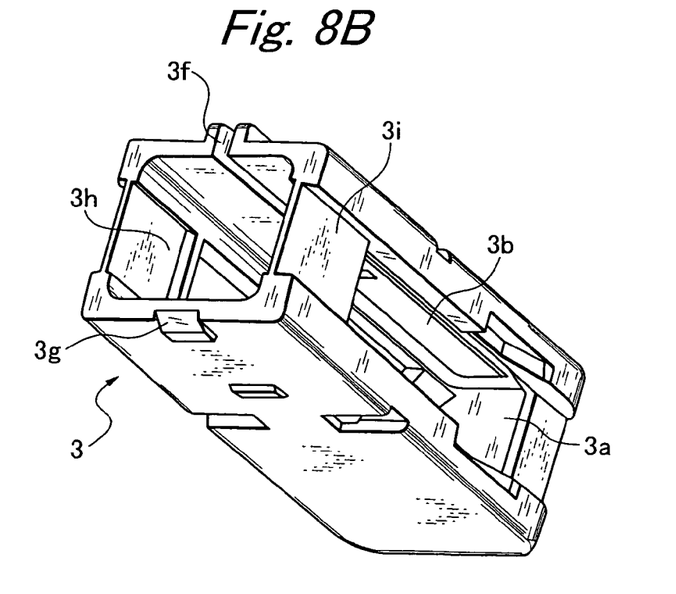

As shown in FIGS. 6A to 7E, the rear cover 5 is formed into an approximately square cylindrical shape (i.e., a hollow rear cover having a substantially rectangular cross section), and has a ridge 5c formed at its top portion. The ridge 5c has a recess portion inside to guide a guide projection 3e of the front cover 3. As shown in FIGS. 7C to 7E, a recessed groove 5d where a projection 3g of the front cover 3 (to be described later) is to be retained has a pull-out stopper formed at a front end portion 5e.

Figure 9A:
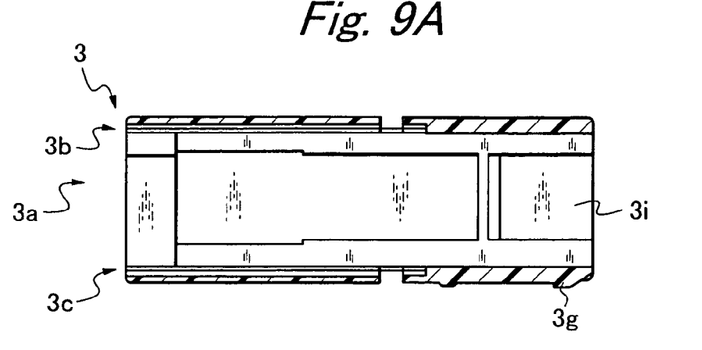
FIGS. 9A and 9B are views showing the front cover as viewed from line 9A-9A in FIG. 8A, and as viewed from line 9B-9B in FIG. 8A, respectively.
Figure 9B:
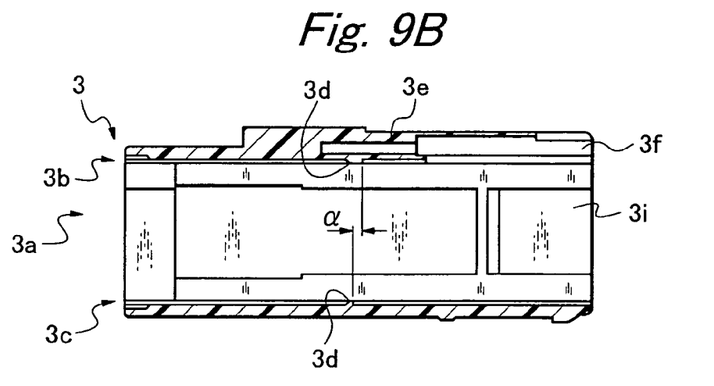
Figure 9C:
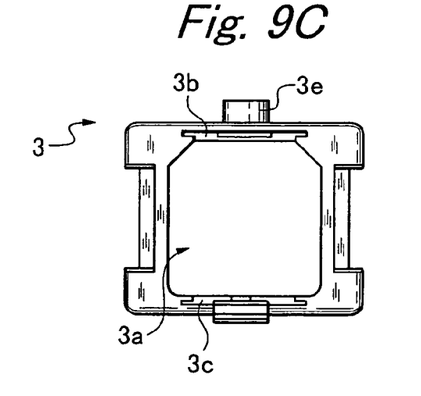
FIG. 9C is a front view thereof.

The front cover 3, as shown in FIGS. 8A to 9C, is formed of a synthetic resin into a square cylindrical shape (i.e., a hollow front cover having a substantially rectangular cross section), and is fitted into the plug frame 10 in such a manner as to be slidable back and forth. As shown in FIGS. 9A to 9C, a pair of retain grooves 3b, 3c are formed inside the front cover 3, facing top and bottom inner walls. The retain grooves 3b, 3c extend inward in proper lengths from a front opening 3a, and engagement projections 3d, 3d are formed approximately at centers of the retain grooves 3b, 3c on the depth side.

The guide projection 3e is provided at the upper center of the front cover 3 to prevent erroneous insertion when the optical connector plug 1 is fitted to the adapter. A recessed groove 3f is formed inside the guide projection 3e from the rear portion thereof to the center. The spring 13 is retained in the recessed groove 3f. The projection 3g (see FIG. 8B) formed at the bottom rear portion of the front cover 3 serves as a frontward reception stopper when the front cover 3 is fitted to the rear cover 5. The front-end faces of rear sidewalls 3h, 3i serve as engagement portions with which elastic engagement pieces 5a, 5b of the rear cover 5 engage (see FIG. 6A).

Figure 10A:
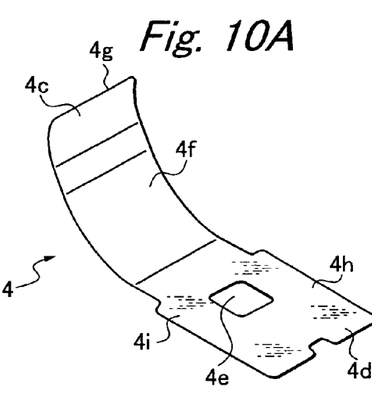
FIGS. 10A, 10B and 10C are a perspective view, a left side view and a plan view each showing a shutter of the optical connector plug.
Figure 10B:
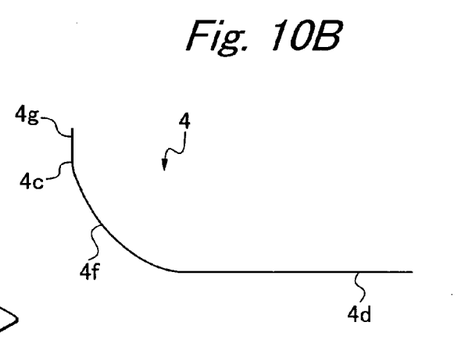
Figure 10C:
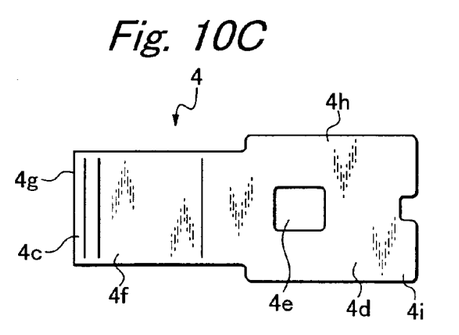

As shown in FIGS. 10A to 10C, a pair of pieces 4a, 4b of shutter 4 to be retained in the retain grooves 3b, 3c of the front cover 3 is a flexible thin metal plate of 0.01 to 0.1 mm in thickness, a front portion 4c is formed in an arc shape curved upward in a normal state when unfitted, and a rear portion 4d is formed flat with an engagement hole 4e formed in approximately the center thereof.

Ears 4h, 4i to be fitted in the retain grooves 3b, 3c of the front cover 3 are respectively formed on both side portions of the rear portion 4d of the shutter 4, protruding outward wider than the width of a curved portion 4f, and are fitted width-wisely full in the retain grooves 3b, 3c to engage therewith.

The width of the curved portion 4f is formed narrower than the width of both end portions of the retain grooves 3b, 3c. The curved portion 4f is formed to have such a length that when extending into the internal space of the front cover 3, the tip portion of the curved portion 4f slightly exceeds the position of the axial center.

Figure 11:
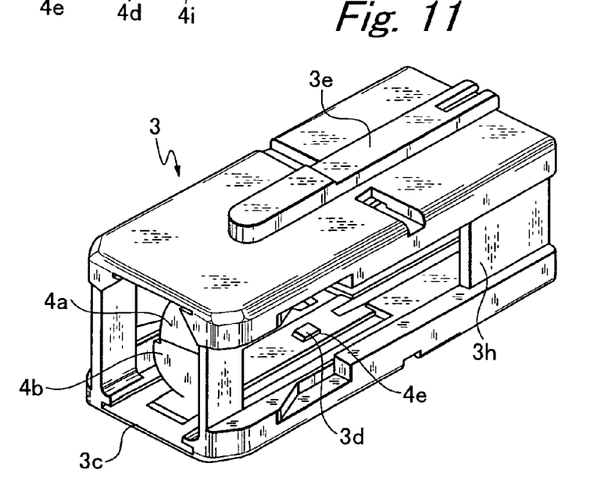
FIG. 11 is a perspective view showing the front cover to which the shutter is attached.

When a pair of upper and lower pieces 4a, 4b of the shutter 4 formed in the above-described manner are attached by fitting the ears 4h, 4i of the rear portion 4d into the upper and lower retain grooves 3b, 3c of the front cover 3, as shown in FIG. 11, tip portions 4g of the front potions 4c of the pair of pieces 4a, 4b overlap each other to surely shield light from the optical fiber end face enclosed in the ferrule 11. As shown in FIG. 9B, the depth sizes of the upper and lower retain grooves 3b, 3c from the end face of the opening 3a of the front cover 3, i.e., the engagement positions of the rear portions 4d of the shutter are set to be shifted by a in the forward and backward direction. With the pair of upper and lower pieces 4a, 4b of the shutter closed, the tip portions 4g surely overlap each other to ensure light shielding.

Although the shutter 4 is configured as the pair of upper and lower pieces 4a, 4b having a same shape in the embodiment, the shutter can be configured as a single piece. In this case, light can be reliably shielded by setting the length of the curved portion 4f of the shutter 4 to the tip portion slightly longer than the one shown in FIGS. 10A to 10C to sufficiently exceed the axial center. Although the retain grooves are formed in the inner walls of the front cover 3 for attachment of the shutter 4, which is not restrictive, recess portions may simply be provided and the rear portions 4d of the shutter 4 may be secured to the inner walls by an adhesive or press-fitting means or the like.

Figure 2A:
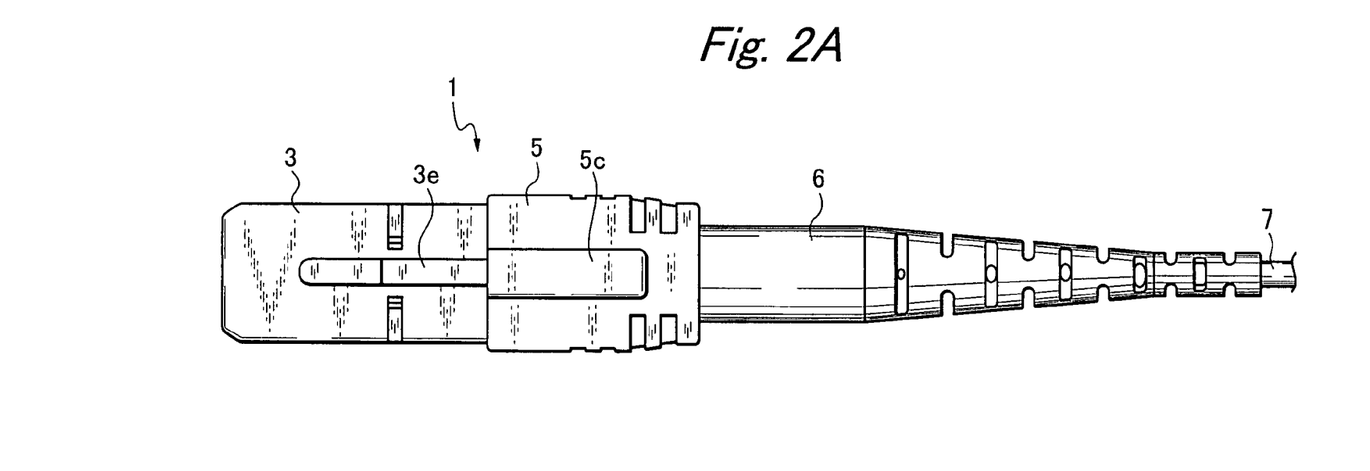
FIGS. 2A and 2B are a plan view and a longitudinal cross-sectional view showing the optical connector plug.
Figure 2B:
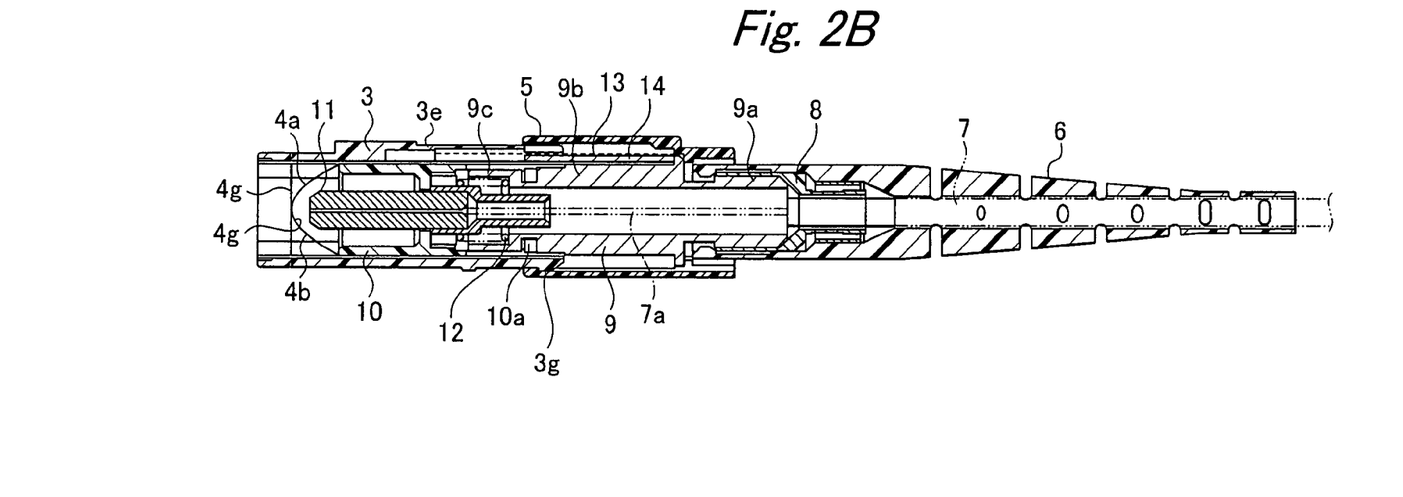

As the light-shielding member 2 is comprised of the front cover 3 slidable back and forth, the pair of pieces 4a, 4b of the shutter 4 which move together with the front cover 3, and the spring 13 for returning the front cover 3 supported on the guide and seat bending prevention pin 14, and the rear portion of the front cover 3 is retained in the space between the stop ring 9 and the rear cover 5 as shown in FIG. 2B, a part of the light-shielding member 2 does not protrude out of the optical connector plug 1, preventing a worker from being injured or so.

The shutter 4 is formed of a metal member having flexibility, and when unfitted, the front potions 4c of the pair of opposing pieces 4a, 4b of the shutter 4 are curved upward and downward so that light from the optical fiber end face enclosed in the ferrule 11 is shielded by the front portions 4c of the shutter 4, whereas when fitted, the shutters move backward together with the front cover 3 along the axial center and the front portions 4c of the shutter abut on a tip portion 10b of the plug frame 10, thus forcibly making the curved portions 4f flat against the flexibility to be retained in the retain grooves 3b, 3c of the front cover 3 to release light shielding. Therefore, the optical connector plug 1 does not require elastic members, such as a return spring for the shutter 4, thus reducing the number of components.

Figure 12A:
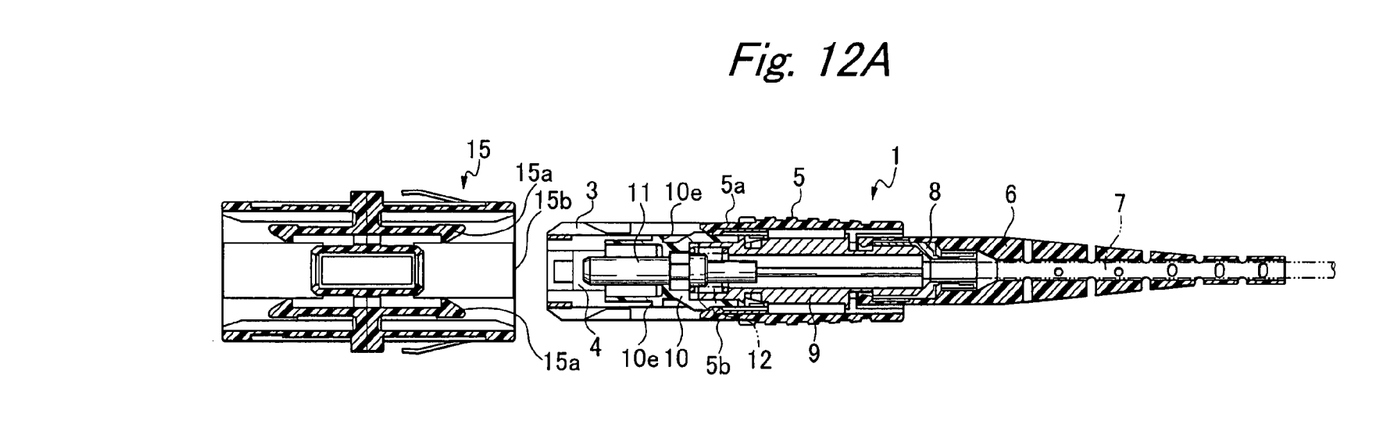
FIGS. 12A and 12B are a longitudinal cross-sectional view and a plan cross-sectional view showing a state before the optical connector plug is fitted to an adapter.

The spring 13 has elastic force (e.g., 0.1 N to 3 N) smaller than the resistance force generated at the time the fitting locking elastic claws 15a, 15a (see FIG. 12) of the adapter 15, when fitted, abut on the front cover 3 to be opened. When the optical connector plug 1 is pulled out of the adapter 15, the front cover 3 that has moved backward at the time of connection is automatically moved forward to return to the original position by using the elastic force of 0.1 N to 3 N.

Figure 12B:
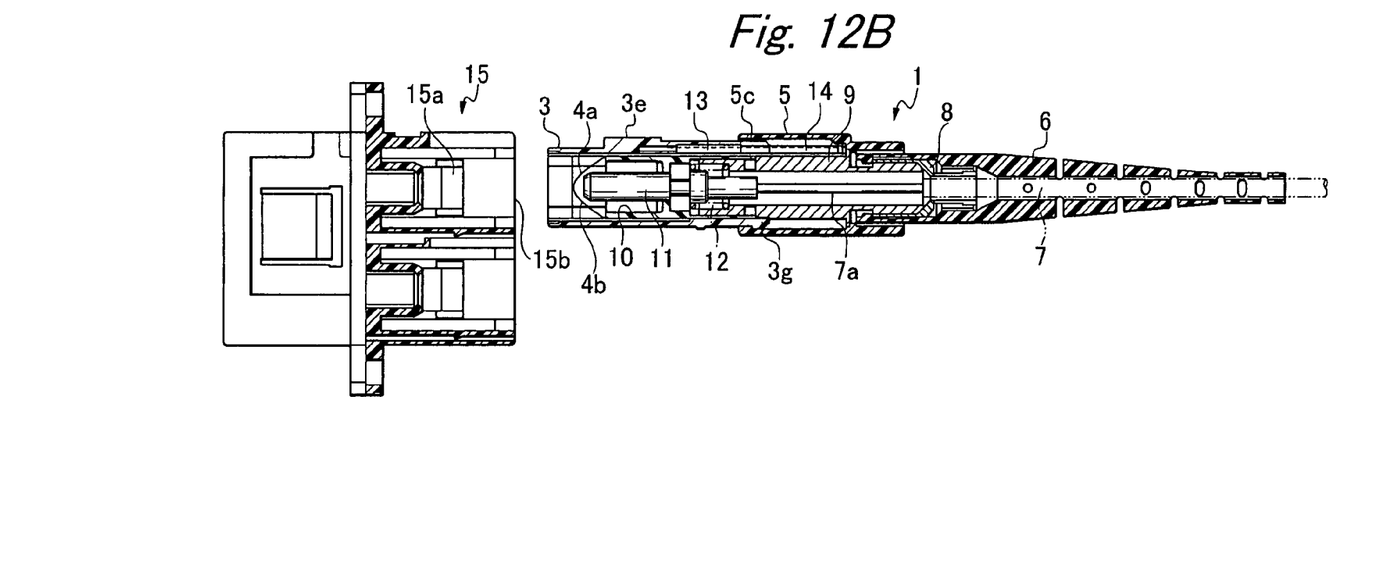
Figure 13A:
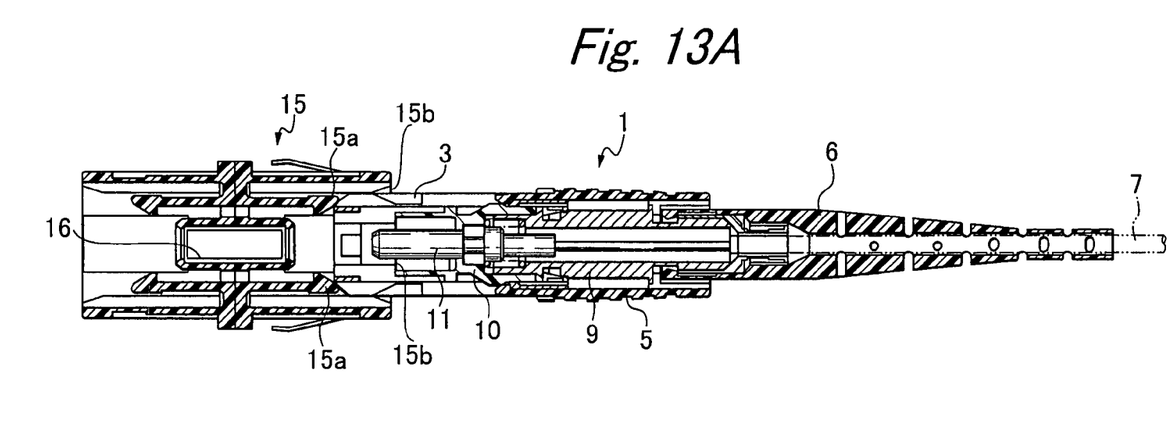
FIGS. 13A and 13B are a longitudinal cross-sectional view and a plan cross-sectional view showing a state of the optical connector plug being fitted to the adapter.
Figure 13B:
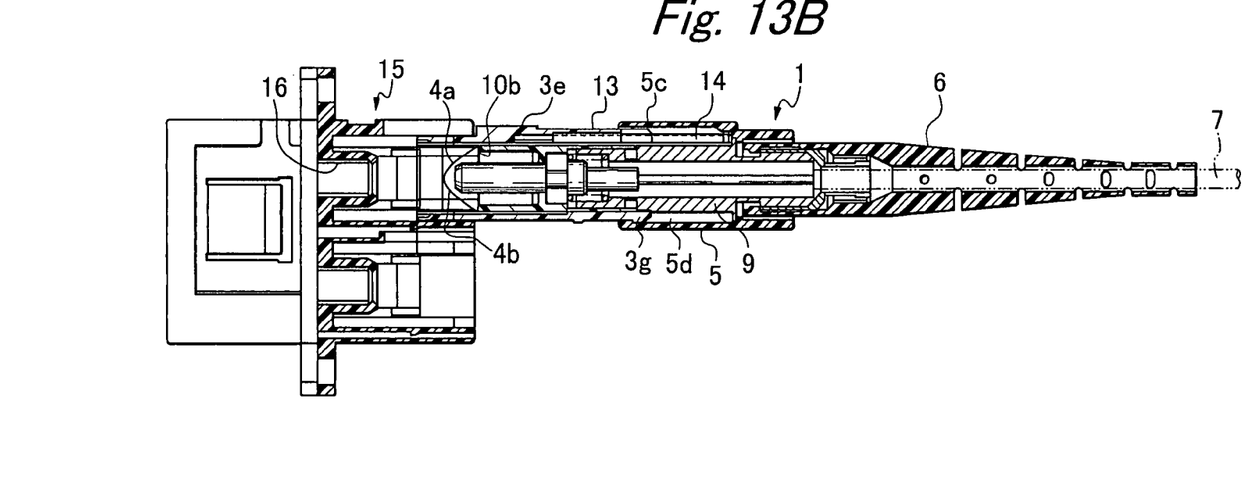

How to use the optical connector plug 1 according to the present invention will now be described referring to FIGS. 12A to 15B. FIGS. 12A and 12B show a state before the optical connector plug 1 is fitted into the adapter 15, in which the tip portions 4g of the pair of pieces 4a, 4b of the shutter 4 overlap each other and close in front of the ferrule 11. As shown in FIGS. 13A and 13B, with the rear cover 5 held, the front cover 3 of the optical connector plug 1 is inserted into an opening 15b of the adapter 15.

The optical connector plug 1 is further inserted from a state shown in FIGS. 13A and 13B where the tip portion of the front cover 3 enters through the opening 15b and abuts on the end portion of the fitting locking elastic claws 15a, 15a of the adapter 15. While the force to widen the fitting locking elastic claws 15a, 15a outward acts, the repulsive force of the elastic claws 15a, 15a which is set greater than the repulsive force of the spring 13 presses the spring 13 against the widening force so that the front cover 3 is pressed backward. As the engagement holes 4e of the pair of shutter pieces 4a, 4b are in engagement with the engagement projections 3d of the front cover 3, the shutter pieces 4a, 4b move backward together with the backward-moving front cover 3 to abut on the tip portion 10b of the plug frame 10. As a result, the curved portions 4f are made flat due to the flexibility and are pressed against the inner walls of the front cover 3 to be fitted in the retain grooves 3b, 3c within the upper-to-lower width range.

Figure 14A:
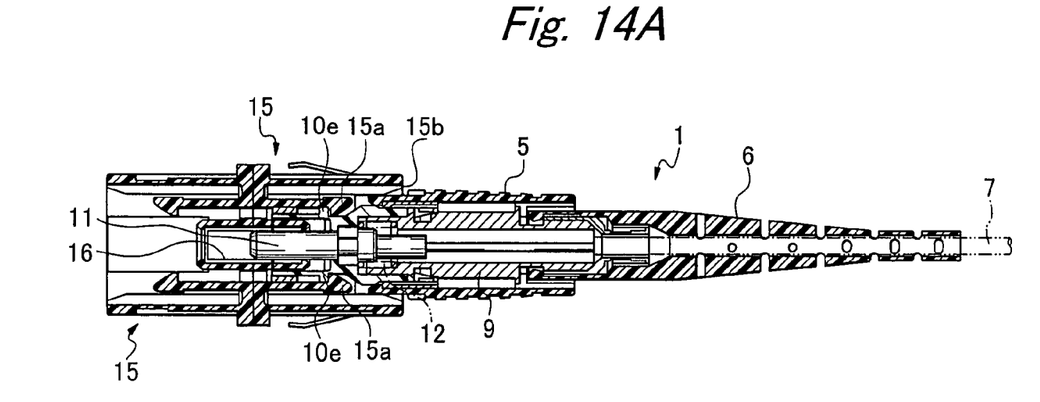
FIGS. 14A and 14B are a longitudinal cross-sectional view and a plan cross-sectional view showing the optical connector plug fitted to the adapter.
Figure 14B:
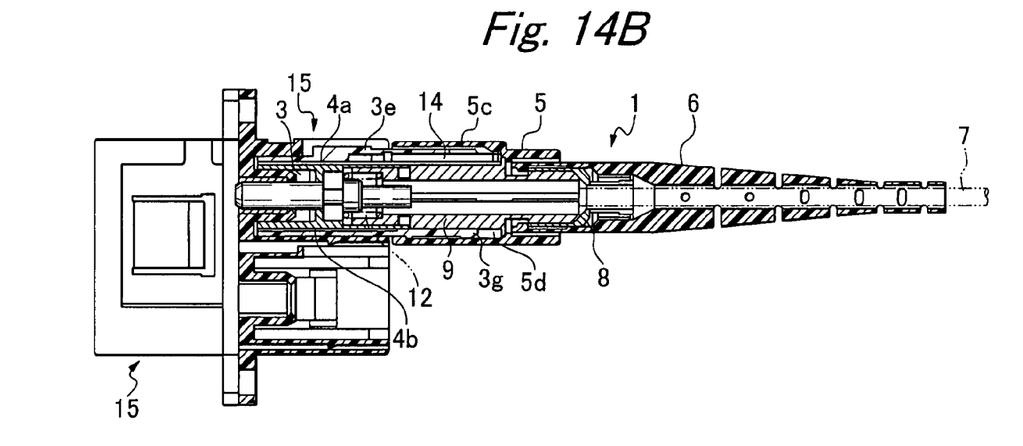
Figure 15A:
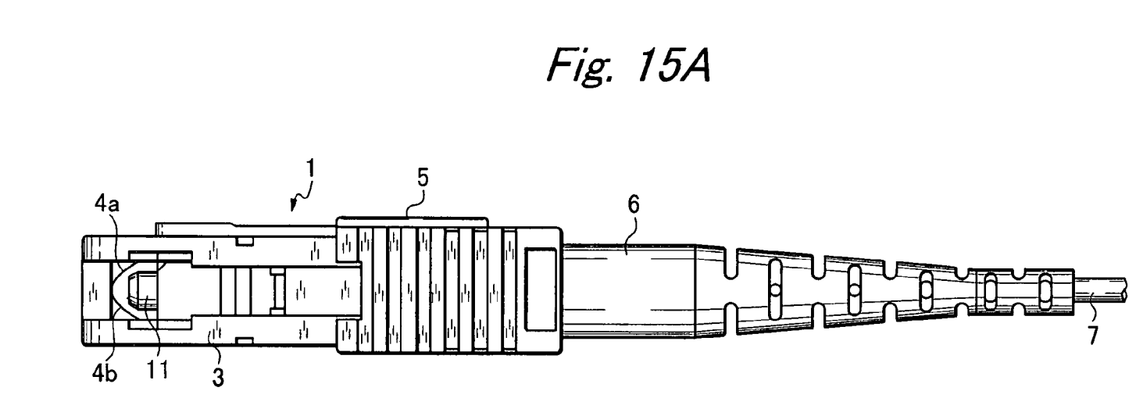
FIGS. 15A and 15B are side views showing states before and after the optical connector plug is fitted to the adapter.
Figure 15B:
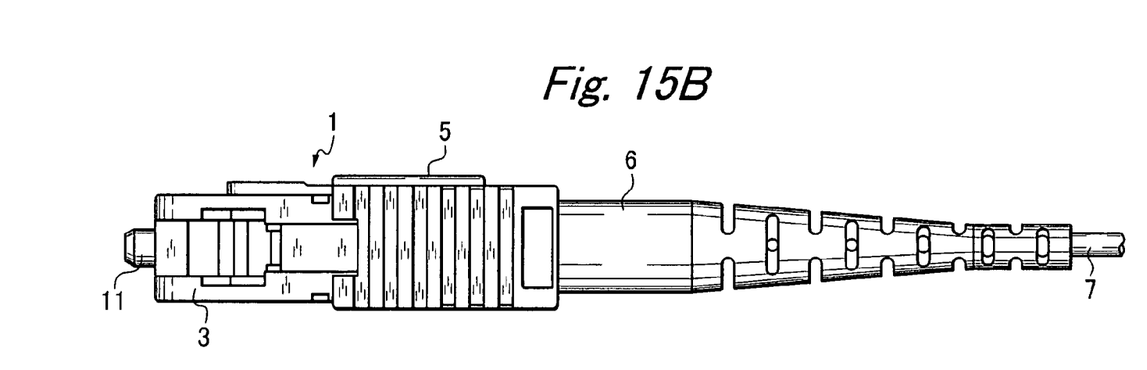

When the front cover 3 moves further backward so that the tip portion of the ferrule 11 protrudes from the front opening portion of the front cover 3, the ferrule 11 is fitted in a split sleeve 16 of the adapter 15 and the fitting locking elastic claws 15a, 15a of the adapter 15 are engaged with the projections 10e, 10e of the plug frame 10 of the optical connector plug 1 (see FIG. 14A). At this time, the guide projection 3e of the front cover 3 is retained in the recess portion of the ridge 5c of the rear cover 5. The shutter pieces 4a, 4b are retained in the retain grooves 3b, 3c in a state of generally flat as mentioned above. This releases the light-shielding action of the light-shielding member 2, thus enabling optical communication of the optical fiber cable 7.

In a case where the optical connector plug 1 is unplugged from the adapter 15, when the fitting locking elastic claws 15a, 15a of the adapter 15 in the state shown in FIG. 14 are disengaged from the projections 10e, 10e of the plug frame 10, the front cover 3 is pushed forward by the urging force of the spring 13. At the same time, the shutter pieces 4a, 4b are moved forward to be released from the pressing of the tip portion 10b of the plug frame 10, so that the curved portions 4f are curved into the original arch shapes due to the flexibility to stand upright in the space in the front cover 3 and the tip portions 4g overlap each other, thereby achieving the light-shielding performance of the optical fiber. That is, the optical connector plug 1 returns to the unfitted state shown in FIG. 15A from the fitted state shown in FIG. 15B.

Figure 16A:
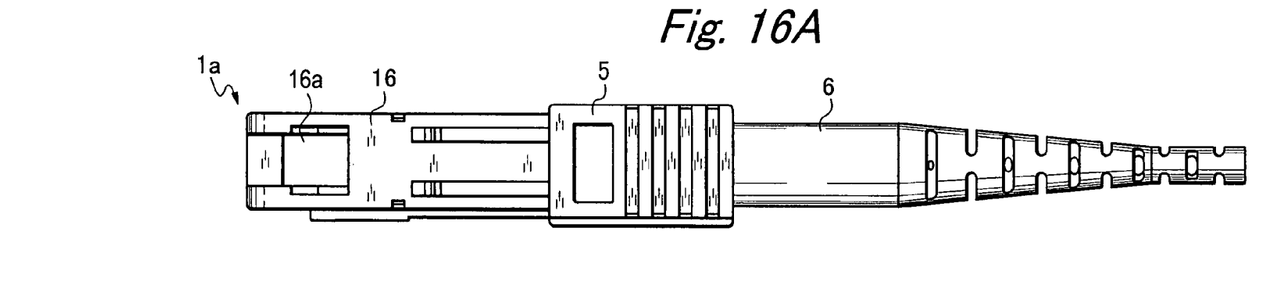
FIGS. 16A, 16B and 16C are a side view, a partly broken-away plan view and a longitudinal cross-sectional view each showing an optical connector plug according to a second embodiment of the present invention.
Figure 16B:
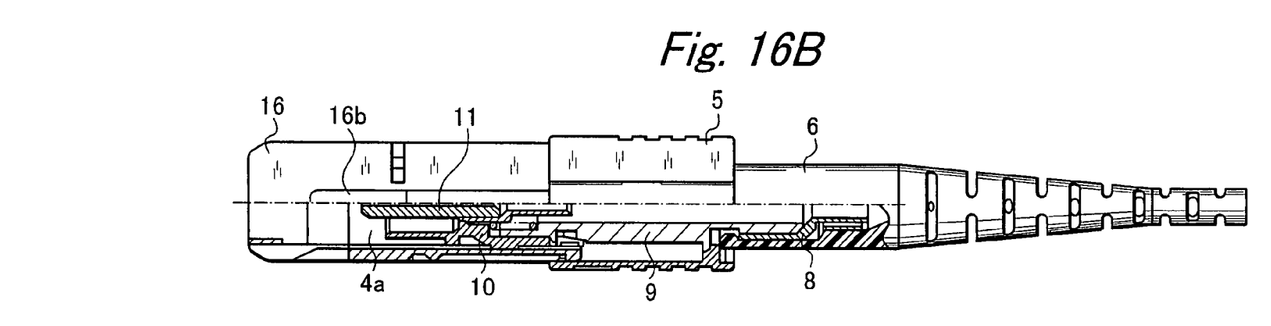
Figure 16C:
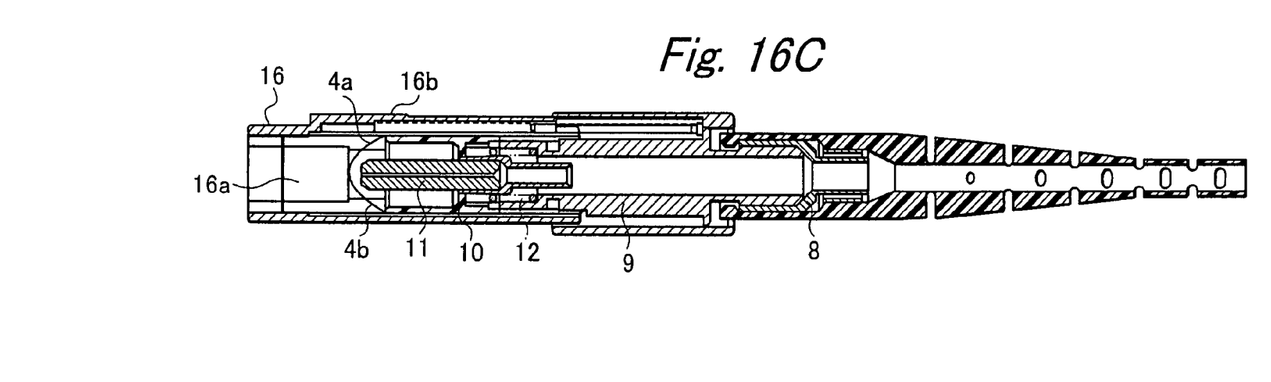

FIGS. 16A, 16B and 16C show an optical connector plug 1a according to a second embodiment of the present invention. In this embodiment, the tip portion of a front cover 16 is elongated frontward so that the ferrule 11 and the shutter pieces 4a, 4b are not seen through windows 16a in sidewalls of the front cover 16. This improves the dust-proofing performance.

Figure 17:
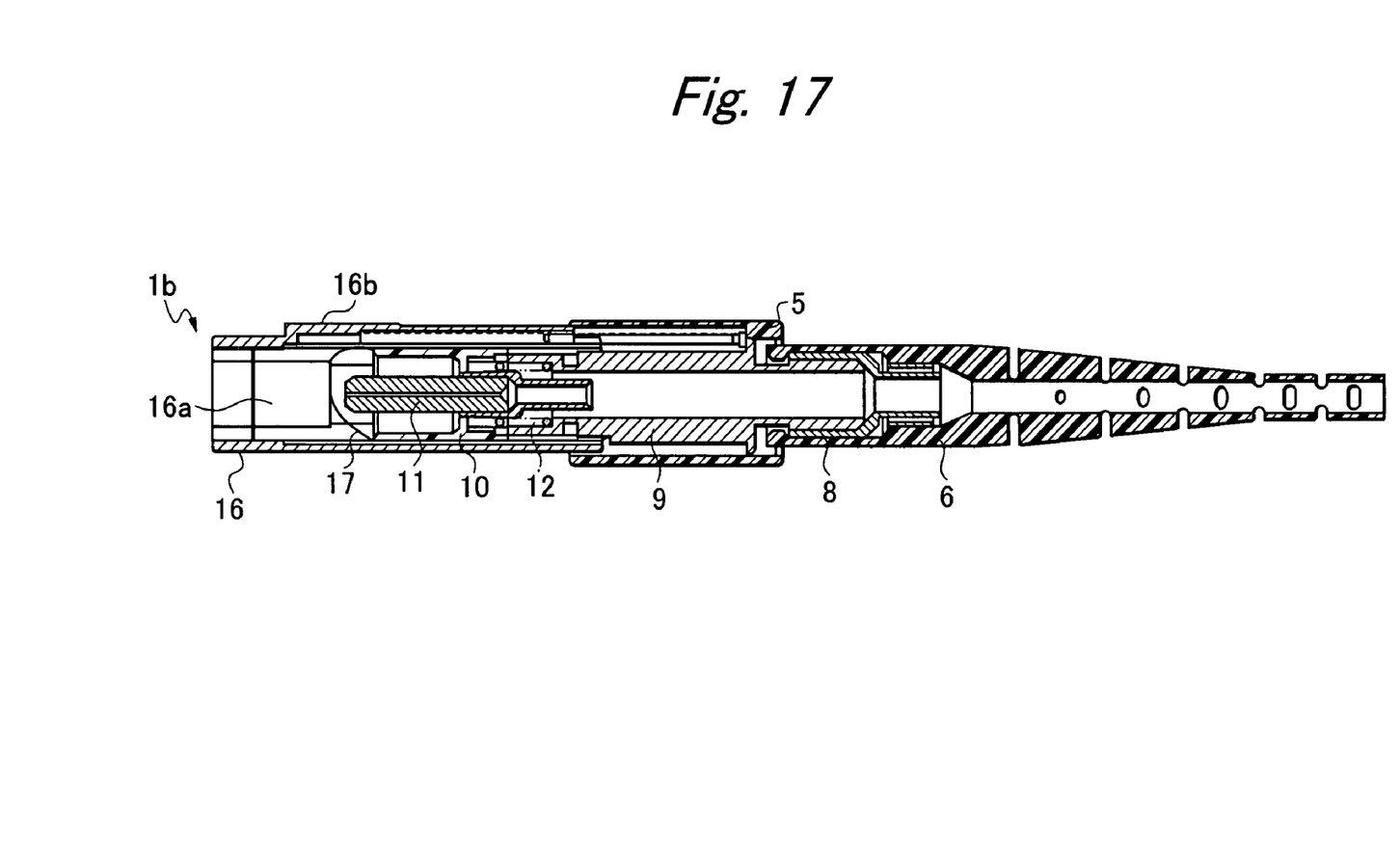
FIG. 17 is a cross-sectional view showing an optical connector plug according to a third embodiment of the present invention.

FIG. 17 shows an optical connector plug 1b according to a third embodiment of the present invention where the pair of pieces of the shutter in the second embodiment are replaced by a single piece 17. Because the amount of frontward and backward movement of the front cover 16 is large, the length of the shutter piece 17 can be made longer, thus ensuring the reliable light-shielding performance. The use of the single piece of shutter can reduce the number of steps of assembling the shutter and the cost.

What is claimed is:

1. An optical connector plug, for use with a counterpart adapter having fitting locking elastic claws, comprising:
   a synthetic resin boot configured to enclose an optical fiber cable;
   a cylindrical stop ring having, at a rear end, a caulking ring, for fixing the optical fiber cable;
   a ferrule configured to support a tip portion of an optical fiber of the optical fiber cable;
   a synthetic resin hollow plug frame, having a substantially rectangular cross section, in which said ferrule is inserted and over which said stop ring is fitted;
   a hollow rear cover, having a substantially rectangular cross section and being an insulating member, fitted over an outer surface of said stop ring;
   a hollow front cover, having a substantially rectangular cross section, mounted to be slidable back and forth at an outer surface of said plug frame between an original, forward position and a rearward position, said front cover being arranged such that, in the rearward position thereof relative to said plug frame, a rear portion of said front cover is retained in a clearance between said stop ring and said rear cover;
   an elastic member, disposed in said clearance between said stop ring and said rear cover, urging said front cover forwardly toward the forward position; and
   a guide and seat bending prevention pin inserted in said elastic member in said clearance between said stop ring and said rear cover;
   wherein said front cover is configured so that, with said rear cover held from outside, said front cover can enter through an opening of the counterpart adapter and abut on the fitting locking elastic claws of the counterpart adapter, and said elastic member has an urging force to be smaller than an engagement resistance force of the fitting locking elastic claws, such that, the abutting of said front cover on the fitting locking elastic claws causes said front cover to be moved rearwardly against the urging force of said elastic member;
   wherein said front cover has, in an interior thereof, an engagement projection; and
   wherein an elastically flexible plate-shaped shutter is mounted in said front cover and has an engagement hole engaged on said engagement projection such that said elastically flexible plate-shaped shutter moves back and forth with said front cover, said shutter having a front portion curved in an arc shape to form a curved portion such that, when said front cover is in the forward position, said shutter is placed in an optical fiber light-shielding state in which said shutter covers said ferrule and, when said front cover is moved to the rearward position, said shutter is pressed by a tip of said plug frame into a plate form with no projection of the shutter protruding outside said front cover to thereby move said shutter out of said optical light-shielding state such that said shutter exposes said ferrule.

2. The optical connector plug according to claim 1, wherein said engagement projection is one of a pair of engagement projections provided on an interior of said front cover; and
   said shutter comprises a pair of shutter pieces each having a front portion curved in an arc shape to form a curved portion such that, when said front cover is in the forward position, said shutter pieces are placed in an optical fiber light-shielding state in which front tip portions of said shutter pieces overlap each other and cover said ferrule and, when said front cover is moved to the rearward position, said shutter pieces are pressed by a tip of said plug frame into a plate form with no projection of the shutter protruding outside said front cover to thereby move said shutter out of said optical light-shielding state such that said shutter exposes said ferrule.

3. The optical connector plug according to claim 1, wherein the shutter is a single piece.

4. The optical connector plug according to claim 1, wherein the front cover has, on a rear outer side, a protrusion extending in an axial direction, and the rear cover has a guide groove at a position corresponding to the protrusion, which receives the protrusion while guiding the protrusion.

5. The optical connector plug according to claim 1, wherein the rear cover has, at both sides, elastic engagement pieces which extend frontward and have engagement claws protruding inside, and the front cover has engagement portions to engage with the engagement claws formed at rear side walls to stop pull-out of the front cover.

* * * * *